MERRYMON & DUNN
Cotton-Planter.
No. 62,664.
Patented Mar. 5, 1867
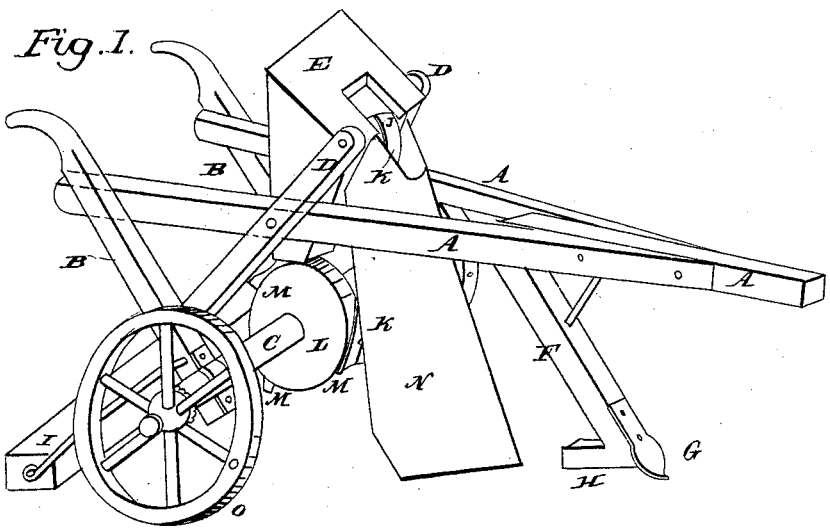
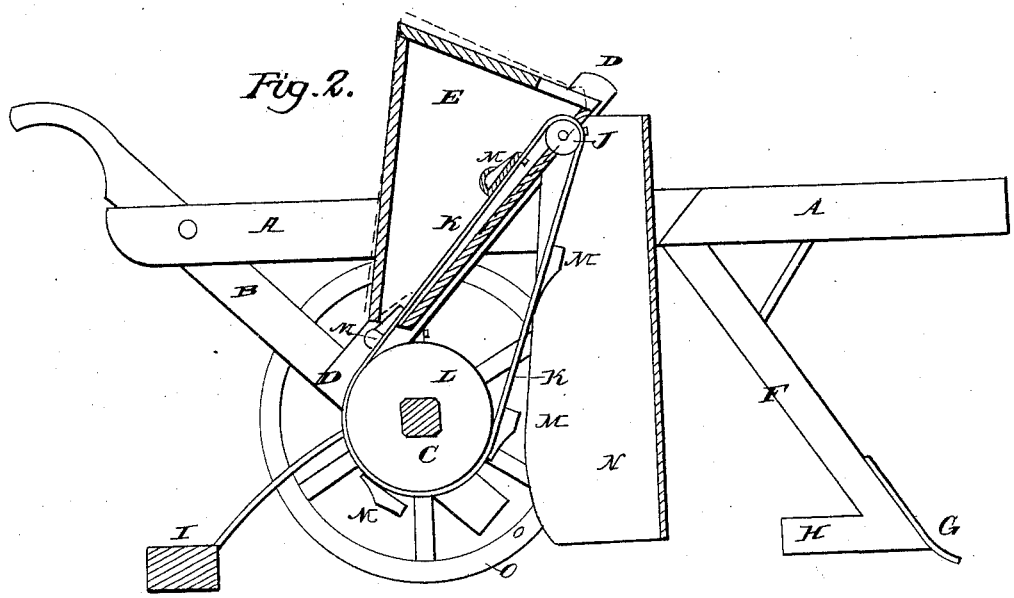
Witnesses
R. D. Smith
Inventor:
John M. Merrymon
Wm. M. Dunn

United States Patent Office.

JOHN M. MERRYMON, OF INDIANAPOLIS, INDIANA, AND WILLIAM M. DUNN, OF GURLEYSVILLE, ALABAMA.

Letters Patent No. 62,664, dated March 5, 1867.

---

IMPROVEMENT IN COTTON-SEED PLANTERS.

---

*The Schedule referred to in these Letters Patent and making part of the same.*

---

TO ALL WHOM IT MAY CONCERN:

Be it known that we, JOHN M. MERRYMON, of Indianapolis, in the county of Marion, and State of Indiana, and WILLIAM M. DUNN, of Gurleysville, in the county of Madison, and State of Alabama, have invented a new and improved Cotton-Seed Planter; and we do hereby declare the following to be a full, clear, and exact description of the same, reference being had to the accompanying drawings, in which—

Figure 1 is a perspective view of our machine.

Figure 2 is a vertical longitudinal section of the same.

Figures 3, 4, and 5 represent modifications in construction.

Our invention consists, first, in arranging a series of cups upon an endless and inclined belt, which enters the seed hopper at its bottom, and passes out over the front of the same, so as to carry the seed from the bottom of the mass upward, and thus exert no tendency to make the seed pack together; second, in mounting the seed hopper upon pivots, upon which it may have a movement to agitate the seed and keep them always descending toward the bottom of the hopper.

The peculiarity of cotton seed is its lint or portions of the staple which adhere to the seed when undergoing the process of ginning. The lint causes the seed to adhere to each other, so that when placed within the seed hopper of a planting machine, they are liable to form an arch over the agitating devices and the mechanism designed to remove them, so that the planting will be exceedingly irregular. For these reasons devices removing the seed from the bottom of the hopper have not hitherto been successful.

That others may understand the construction and operation of our machine, we will particularly describe it.

A A are the beams forming the main frame, which may be of any convenient form, though the triangular form shown in the drawings is preferred. B B are the handles, by means of which the attendant manages the machine and guides it while in operation. The handles B descend some distance below the main frame, and to them the bearings for the main axle C are attached. They are braced by the braces D D, which are secured at their lower ends to said handles, and about midway of their length to the beams A A, and at their tops to the upper edge of the seed hopper E. At the front of the machine is the post F, to the lower end of which is the shovel G to open the furrow into which the seed is to be dropped. At the foot of the post F, and extending backward therefrom, is the shoe H, which prevents the plough from sinking too deeply into the soil, and it also serves to keep the disturbed earth from falling into the trench in the rear of the shovel G. The concave drag I is attached at the rear of the machine, and serves to draw the earth into the trench after the seed have been deposited therein, and thus cover them and complete the operation of planting. The portions of the machine alluded to above contain no peculiarity not found in machines of this class. The hopper E is suspended from the tops of the braces D D by pivots concentric with the axis of the roller J, over which the band K passes in leaving the hopper. The hopper is in the form of an inverted pyramid, suspended at a point near its larger end or base and near one side. The band or endless belt K passes over the drum-wheel J at the top of the hopper, and under the driving-pulley L upon the shaft C. To the outer surface of this belt are attached, by a rivet at one end only, and at regular intervals and at proper distance from each other, the cups M, which receive the seed, carry them over the roller J, and scatter them through the shoot N into the trench made by the shovel G. The cups M are provided with long tapering sides, as shown in the drawings, so that, as they advance to the orifice in the bottom of the hopper, they may open the same automatically. This opening of the orifice consists in moving the hopper itself slightly upon its pivot at the top, as shown by the red lines. As soon as the cup has passed within the hopper, the latter falls to its normal position again suddenly, so as to impart a sudden jar to the seed within the hopper, and this jar, in conjunction with the passage of the cups M through the seed, agitates them sufficiently to prevent all packing and adherence on account of the lint. The axle C has, at each of its ends, a bearing-wheel, O, and these wheels are rendered rigid with the axle by an ordinary ratchet and pawl, such as are in common use in machines where it is desired that the axle should revolve with the wheels while moving forward, but should be independent thereof when moving backward. The shoot N is narrow from side to side, and when the seed fall out of the cup as it passes over the roller J, they are scattered through the said shoot, so as to be planted quite evenly, in the manner known as drilled.

The oblique position of the belt K, in passing through the seed hopper, insures the continued pressure of the seed upon said belt and into the cups M, because the mass of the seed is vertically above said belt. Any agitation which will cause the seed to descend in the hopper will cause it to press upon the upper surface of the belt. The hopper is also so constructed that no seed can get behind the belt to interfere with the agitating movements of the hopper. When the cup M reaches the top of the hopper, the small size of the roller J, and the length and mode of fastening of the cups M, cause said cups to be thrown up suddenly, as shown by red lines in fig. 2, and by this sudden movement of the cup, the seed are ejected into the shoot N, and are scattered as heretofore described.

Having described our invention, what we claim as new, and desire to secure by Letters Patent, is—

1. Suspending the hopper E upon a pivot, or its equivalent, so that it may be vibrated for the purpose of agitating the enclosed seed.

2. Placing the seed hopper of the seeding machine so that the feeding device, passing in at the bottom and out at the top, shall pass (vertically) beneath the contained seed.

3. Agitating the seed hopper of the seeding machine, by the passage of the feeding device through the same, for the purpose set forth.

4. The cup M, constructed and attached as described, so that in passing over the upper roller J the seed will be thrown out, as set forth.

JOHN M. MERRYMON,
WM. M. DUNN.

Witnesses:
   R. D. O. SMITH,
   PHILIP C. DIETRICH.